(12) United States Patent | (10) Patent No.: US 12,659,334 B2
Corrigan | (45) Date of Patent: Jun. 16, 2026

(54) METHOD AND DEVICE FOR PROCESSING A NETWORK DATA STREAM

(71) Applicant: PA KNOWLEDGE LIMITED, London (GB)

(72) Inventor: Elizabeth Mary Corrigan, Cambridgeshire (GB)

(73) Assignee: PA KNOWLEDGE LIMITED, London (GB)

(*) Notice: Subject to any disclaimer, the term of this patent is extended or adjusted under 35 U.S.C. 154(b) by 86 days.

(21) Appl. No.: 18/692,549

(22) PCT Filed: Sep. 16, 2022

(86) PCT No.: PCT/GB2022/052351
§ 371 (c)(1),
(2) Date: Mar. 15, 2024

(87) PCT Pub. No.: WO2023/041924
PCT Pub. Date: Mar. 23, 2023

(65) Prior Publication Data
US 2024/0388593 A1 Nov. 21, 2024

(30) Foreign Application Priority Data

Sep. 17, 2021 (GB) ..................................... 2113336
Nov. 19, 2021 (GB) ..................................... 2116710

(51) Int. Cl.
*H04L 29/06* (2006.01)
*H04L 9/40* (2022.01)
(52) U.S. Cl.
CPC ................................. *H04L 63/1425* (2013.01)
(58) Field of Classification Search
CPC ............. H04L 63/1425; H04L 43/0858; H04L 43/0894; H04L 63/1416; G06F 21/567
See application file for complete search history.

(56) References Cited

U.S. PATENT DOCUMENTS 5,414,833 A * 5/1995 Hershey ................ H04L 63/145
713/188
8,782,514 B1 7/2014 Chiu
(Continued)

FOREIGN PATENT DOCUMENTS

WO 2020/058658 A1 3/2020

OTHER PUBLICATIONS

Todd Mytkowicz et al. Data Parallel Finite-State Machines (2014) APLOS. vol. 42. No 1. pp. 529-542.
(Continued)

*Primary Examiner* — Ka Shan Choy
(74) *Attorney, Agent, or Firm* — Harness, Dickey & Pierce, P.L.C.

(57) ABSTRACT

According to an aspect of the disclosure there is provided a method of processing a network data stream, comprising: receiving an input data stream; segmenting the received input data stream into a plurality of data stream segments; processing the data stream segments using plural sets of plural identical finite state machines, wherein successive data stream segments are processed by different sets of said plural sets and said plural identical finite state machines comprises finite state machines having initial states corresponding to every different possible state; recording the initial state before processing and a final state after processing, for each state machine; generating an output based on mapping the final state for a data stream segment to a corresponding initial state for a subsequent data stream segment, for each of the plurality of data stream segments.

14 Claims, 7 Drawing Sheets

(56)     References Cited

U.S. PATENT DOCUMENTS

| 2004/0151382 | A1* | 8/2004 | Stellenberg | ......... | H04L 63/1416 |
| | | | | | 382/219 |
| 2006/0167915 | A1* | 7/2006 | Furlong | ................. | G06Q 10/06 |
| 2006/0212942 | A1* | 9/2006 | Barford | .............. | H04L 63/1425 |
| | | | | | 713/188 |
| 2013/0111055 | A1 | 5/2013 | Chang | | |
| 2014/0208433 | A1 | 7/2014 | Mraz et al. | | |
| 2016/0285895 | A1* | 9/2016 | Zheng | ................... | G06F 21/566 |

OTHER PUBLICATIONS

Youwei Zhuo et al. CSE: Parallel Finite State Machines with Convergence Set Enumeration (2018) 51st Annual IEEE/ACM International Symposium on Microarchitecture. pp. 29-41.
Arun Subramaniyan et al. Parallel Automata Processor (2017) ACM/IEE 44th Annual International Symposium on Computer Architecture. pp. 600-612.

* cited by examiner

Fig. 2

METHOD AND DEVICE FOR PROCESSING A NETWORK DATA STREAM

CROSS REFERENCE TO RELATED APPLICATIONS

This application is a U.S. National Phase Application under 35 U.S.C. 371 of International Application No. PCT/GB2022/052351, filed on Sep. 16, 2022, which claims priority to United Kingdom Application No. 2113336.8, filed on Sep. 17, 2021 and also Untied Kingdom Application No. 2116710.1, filed on Nov. 19, 2021. The entire disclosure of each application is expressly incorporated by reference herein.

TECHNICAL FIELD

The present disclosure relates to a method and device for processing a network data stream.

BACKGROUND ART

Finite state machines (FSMs) can be used to process a network data stream for a number of purposes. One such purpose is to verify the syntax of data to reduce the likelihood that the data contains malware that could attack the network. Syntax verification may be combined with other security functions, such as one-way data transfer, to protect a network from cyber-attacks.

A FSM may be hardware implemented. For example, a field programmable gate array (FPGA) may be programmed as a FSM. The processing rate of such a FSM is determined by the hardware, by parameters such as clock speed and the number of bits processed per clock cycle. For example, if a processor that implements a state machine acts on 8 bits of data in each execution cycle and can operate at 125 Mcycle/s, then the state machine can process data at an equivalent of 1 Gbit/s. If the data rate of the incoming data stream is higher than 1 Gbit/s, for example a 10 GbE Ethernet data stream providing 10 Gbit/s of data, then the FSM cannot keep pace with the incoming data.

It is an aim of the present disclosure to at least partially address the problems discussed above.

SUMMARY OF THE INVENTION

According to an aspect of the disclosure there is provided a method of processing a network data stream, comprising: receiving an input data stream; segmenting the received input data stream into a plurality of data stream segments; processing the data stream segments using plural sets of plural identical finite state machines, wherein successive data stream segments are processed by different sets of said plural sets and said plural identical finite state machines comprises finite state machines having initial states corresponding to every different possible state; recording the initial state before processing and a final state after processing, for each state machine; generating an output based on mapping the final state for a data stream segment to a corresponding initial state for a subsequent data stream segment, for each of the plurality of data stream segments.

Optionally, the segmenting is based on a predetermined data length.

Optionally, the data stream comprises data files and each data stream segment comprises data for only one data file.

Optionally, the plurality of identical finite state machines processing each data stream each perform said processing in parallel.

Optionally, the input data rate is greater than the processing rate of each finite state machine. Optionally, the number of plural sets multiplied by the processing rate of each finite state machine is equal to or greater than the input data rate.

Optionally, the input data rate is at least 10 Gbits/s.

Optionally, the network data stream is a 10 Gigabit Ethernet data stream.

Optionally, the identical finite state machines are configured to verify that the content of the input data stream complies with a predefined syntactic structure. Optionally, if the input data stream comprises data that does not comply with the predefined syntactic structure, said data is modified before being output. Optionally, the modification comprises wrapping said data.

Optionally, the direction of data transfer is restricted to only occur from the input to the output.

Optionally, the finite state machines comprise one or more counters, wherein said output is also based on combining counter values for the data stream segment and subsequent data stream segment.

According to a second aspect of the disclosure, there is provided a device for processing a network data stream, comprising: input network interface configured to receive an input data stream; one or more processing units configured to: segment the received input data stream into a plurality of data stream segments; process the data stream segments using plural sets of plural identical finite state machines, wherein successive data stream segments are processed by different sets of said plural sets and said plural identical finite state machines comprises finite state machines having starting states corresponding to every different possible state; record the initial state before processing and a final state after processing, for each state machine; generate an output based on mapping the final state for a data stream segment to a corresponding initial state for a subsequent data stream segment, for each of the plurality of data stream segments; and an output network interface configured to output an output data stream based on the generated output.

Optionally, the device is configured to verify that the content of the input data stream complies with a predefined syntactic structure.

Optionally, if the input data stream comprises data that does not comply with the predefined syntactic structure, said data is modified by the one or more processing units before being output. Optionally, the modification comprises wrapping said data.

Optionally, the direction of data transfer across the device is restricted to only occur from the input network interface to the output network interface.

BRIEF DESCRIPTION OF THE DRAWINGS

Further features of the invention are described below, by way of non-limiting examples, and with reference to the accompanying drawings, in which:

FIG. 2 is a flow diagram schematically showing illustrative example finite state machine processing steps;

DETAILED DESCRIPTION

Figure 1:
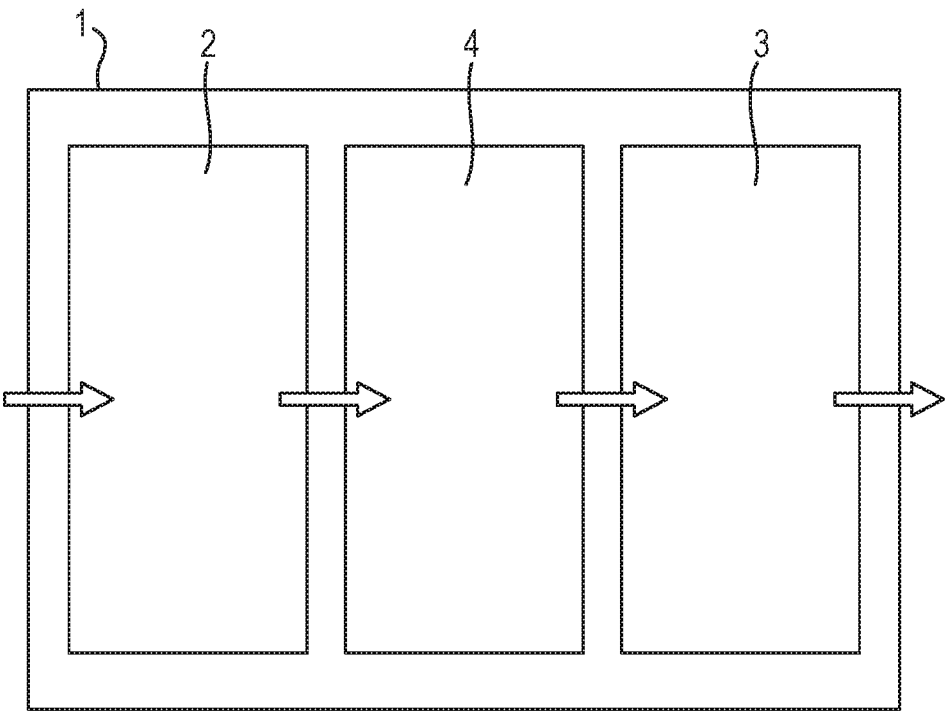
FIG. 1 is a schematic drawing of an example device of the disclosure.

An example device 1 is shown in FIG. 1. As shown, the device 1 may comprise an input network interface 2. The input network interface 2 is configured to receive data from sources external to the device 1. The device may further comprise an output network interface 3. The output network interface 3 is configured to output data to destinations external to the device 1. The input and output network interfaces 2, 3 may be wired (e.g. LAN) or wireless (e.g. WLAN) interfaces.

As shown in FIG. 1, the device may comprise a security function performing part 4, between the input network interface 2 and the output network interface 3.

The security function performing part 4 may perform a syntax checking function. This syntax checking may be performed by the data processing method according to the present disclosure, as described further below. The syntax checking verifies whether or not data complies with a predefined syntax. Data that does not comply may be deemed a cyber-security threat. The syntax of each packet of data, e.g. comprising a header and a payload, may be checked.

If the data complies with a predefined syntax, then the data may be output at the output network interface 3, without modification. If the data does not comply with the predefined syntax, the data may be modified before being output at the output network interface 3. Non-compliant data may be modified in such a way as to render potential malware safe, e.g. unexecutable. For example, the non-compliant data may be wrapped, e.g. by a numerical wrapping algorithm.

Before syntax verification, the data may be transformed to an intermediate format, e.g. that can be processed more efficiently, and then reverse transformed after syntax verification into the original format.

Figure 2:
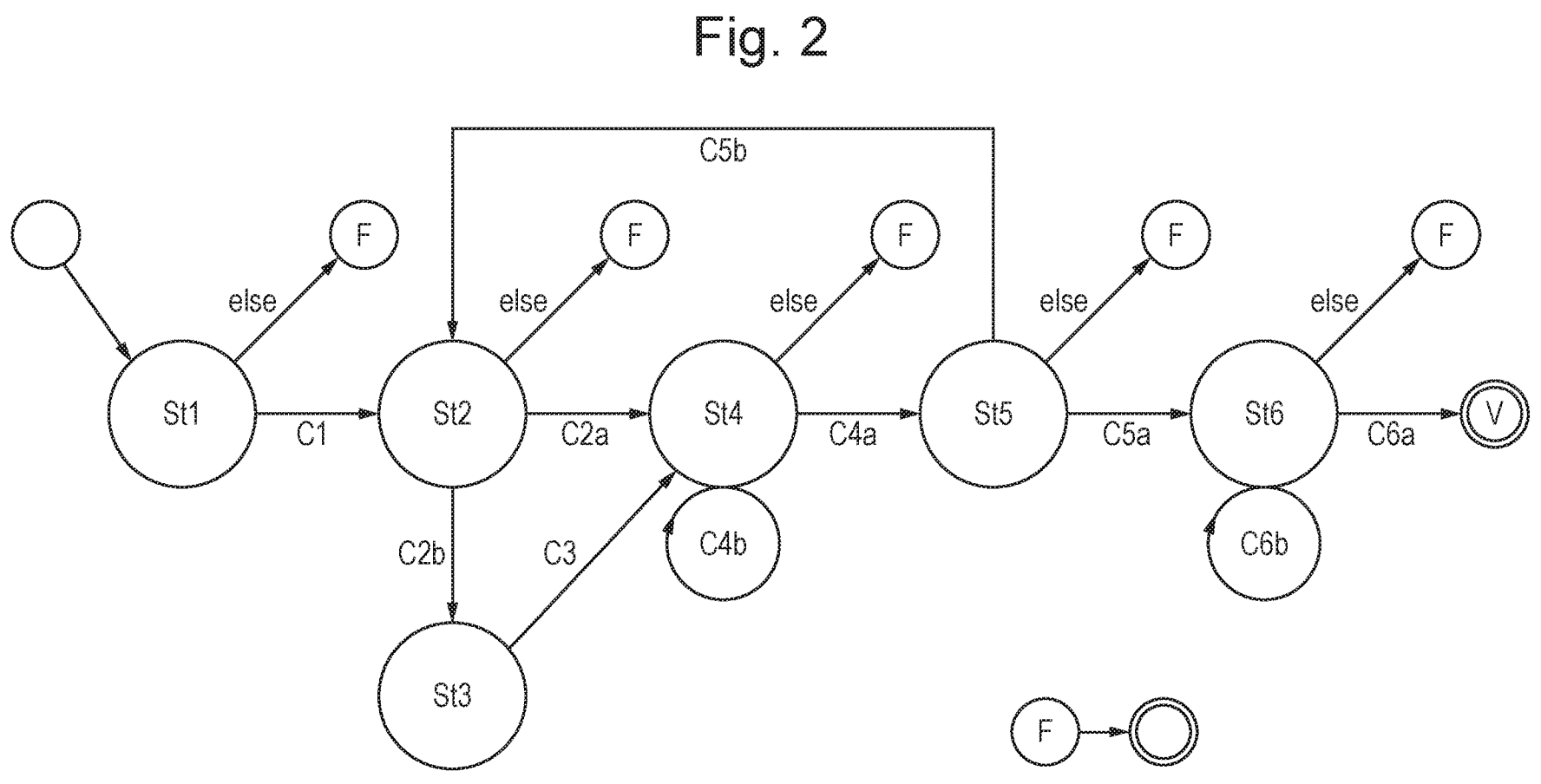

FIG. 2 shows an illustrative processing method for syntax verification performed by a FSM. The next state of the FSM depends on the current state and the current input data. As shown, the illustrative example state machine may be in one of seven possible states St1 to St6, V and F and may change from one state to another state if the data satisfies conditions C1 to C6a. The FSM operates cyclically until all the data is processed. If all relevant conditions are satisfied then the data is verified as having a compliant syntax when end state V is reached. Elsewise, the data is considered non-compliant if end state F is reached. When an and state, V or F, is reached the FSM may return to the start state St1, as shown in FIG. 2.

Figure 3:
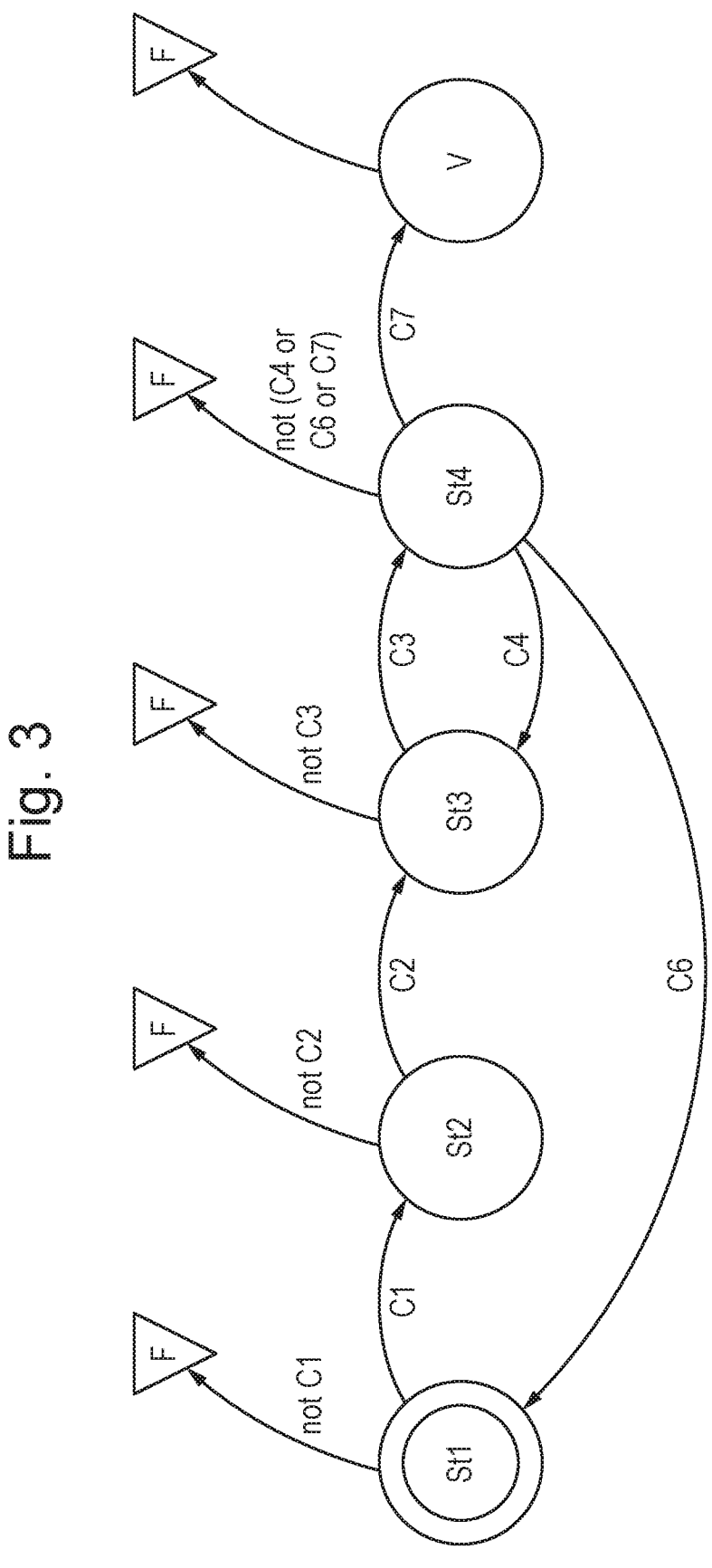
FIG. 3 is a state transition diagram schematically showing illustrative example finite state machine.

FIG. 3 shows a second illustrative processing method for syntax verification performed by a FSM. The next state of the FSM depends on the current state and the current input data. As shown, the illustrative example state machine may be in one of six possible states St1 to St4, V and F and may change from one state to another state if the data satisfies conditions C1 to C7. The FSM operates cyclically until all the data is processed. If all relevant conditions are satisfied then the data is verified as having a compliant syntax when end state V is reached. Elsewise, the data is considered non-compliant if end state F is reached or if all data has been processed and the FSM has not reached the V state.

In some examples, the FSM may comprise one or more counters, e.g. that count or track a particular piece of information. For example, the FSM may remain in the same state until a particular condition is met and a counter may count the number of clocks the FSM remains in that state. Alternatively, the FSM may count the occurrence of a particular feature in the data, such as nestings and one or more counters may count up and/or down nesting levels. If a counter reaches an invalid range (e.g. reaches a threshold), the FSM may move into another state (e.g. end state F).

Figure 4:
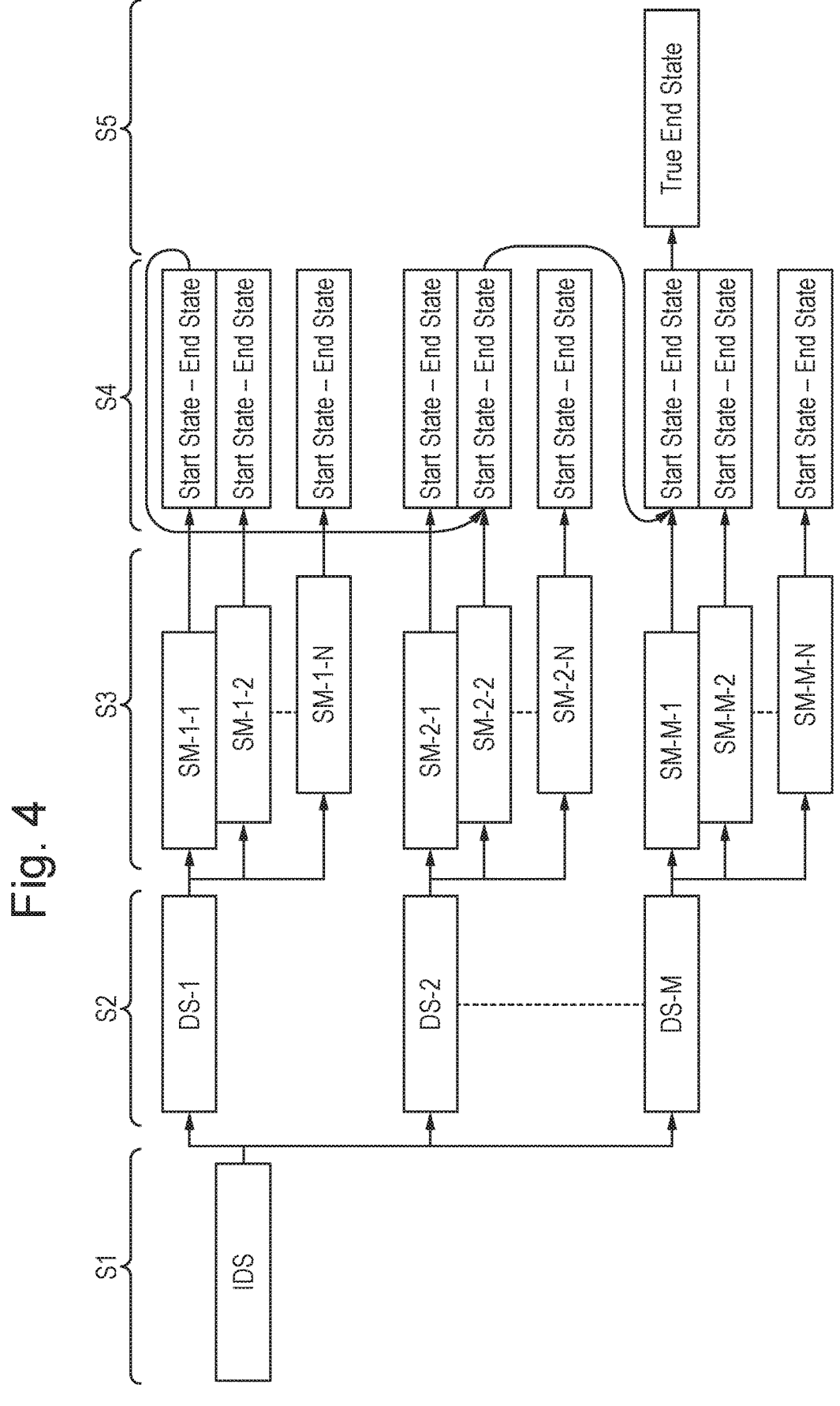
FIG. 4 is a data flow diagram schematically showing example processing steps accordingly to the processing method of the disclosure.

FIG. 4 is a data flow diagram schematically showing example processing steps according to the present disclosure. This processing method may increase the processing speed of the above described syntax verification, for example, to enable the device 1 to process data at a higher rate. However, the processing method is not limited by the application to syntax verification, it may apply to any processing that can be performed by a FSM.

As shown in FIG. 4, an input data stream is received (step S1) and is segmented into a plurality of data stream segments DS-1 to DS-M (step S2). The data stream segments are processed using plural (M) sets of plural (N) identical FSMs, SM-1-1 to SM-M-N(step S3).

Successive data stream segments are processed by different sets of said plural sets of FSMs. For example, as shown, DS-1 is processed by the set SM-1 comprising FSMs SM-1-1 to SM-1-N. Said plural identical FSMs comprise FSMs having initial states corresponding to every different possible state. For example, FMSs SM-1-1 to SM-1-N each have a different initial state.

The input data stream IDS may be continuously segmented, with each successive segment being sent (substantially in parallel) to the plural sets of FSMs cyclically, i.e. an M+1th data stream segment may be sent to the first set of FSMs SM-1, and so forth, by which time the previous processing would have been completed by that set of FSMs.

An initial state before processing and a final state after processing is recorded, for each state machine (S4). As shown in FIG. 4, an output is generated (S5) based on mapping the final state for a data stream segment to a corresponding initial state for a subsequent data stream segment, for each of the plurality of data stream segments DS-1 to DS-M. For example, after each segment is processed final state may be passed to the subsequent segment. Accordingly, a true final state can be identified.

For example FSMs where a counter is incremented or decremented, the counter value may be passed also.

The segmenting of the input data stream IDS into data stream segments DS, may be based on a predetermined data length. That is, each data stream segment DS may comprise X bits of data, e.g. an integer number of bytes. However, each packet of data in the network data stream, on which syntax checking is performed, may not be of consistent size.

If the packet size is less than or equal to the data stream segment size, and entirely contained within one data stream segment, then that packet may be entirely processed by the one set of FSMs corresponding to that one data stream.

If the packet size is greater than the data stream segment size, or spans two or more data stream segments, then that datagram may be processed by the two or more sets of FSMs corresponding to said two or more data streams, by mapping final to initial states for subsequent sets of FMSs.

For the first data stream segment to be processed, the initial state is known. This may be, e.g. a start state St1 of the syntax verification process (e.g. rather than an intermediate state or end state). Accordingly, the corresponding final state, after processing, can be mapped to the FSM with the same initial state for the subsequent data stream segment, and so forth, until all data has been processed.

Figure 5:
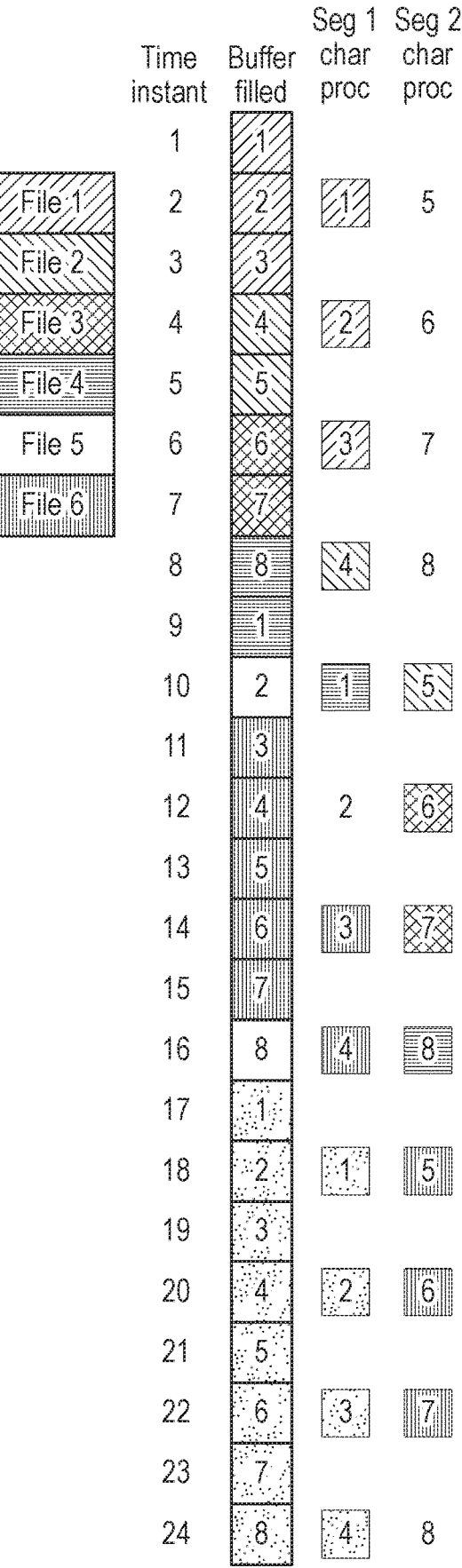
FIG. 5 is a diagram showing an example processing method in which a data stream illustrated by blocks is processed.

FIG. 5 shows an example processing method in which a data stream illustrated by blocks and comprising different data files (packets) is processed by two parallel sets of FSMs operating at half the processing rate of the input data stream. In this illustrative example, segmenting is performed every four blocks and a buffer is filled and refreshed after eight blocks. FIG. 4 figure illustrates which blocks are processed by each set of FMSs.

Figure 6:
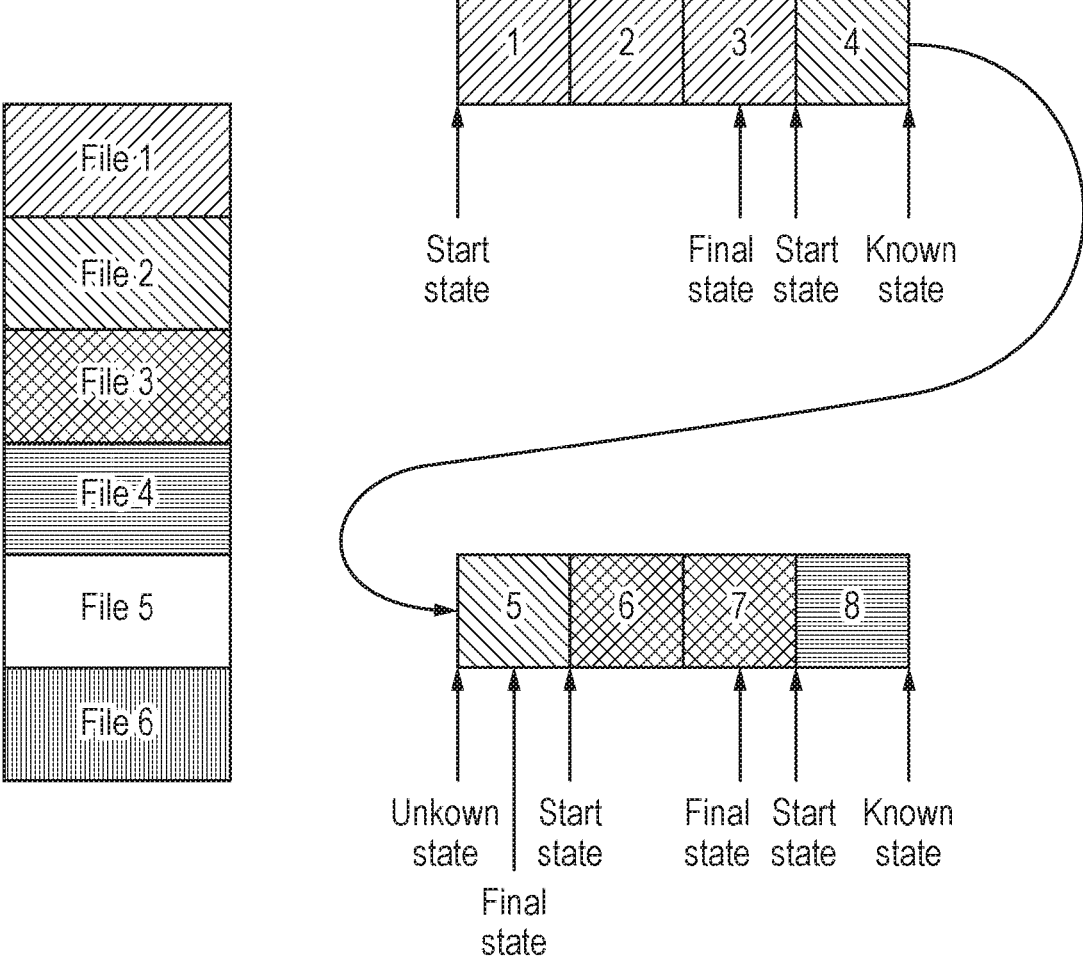
FIG. 6 is a diagram showing how the final state for each segment may be passed to the next segment in the example of FIG. 5.

FIG. 6 shows how the final state for each segment may be passed to the next segment. At that point, the unknown initial state for the second segment becomes known. Similarly, when the second segment is processed the final state is passed to the next segment (which is processed by the first set of FSMs). FIG. 5 also illustrates how the FSM may return to the start state after an end state is reached.

Figure 7:
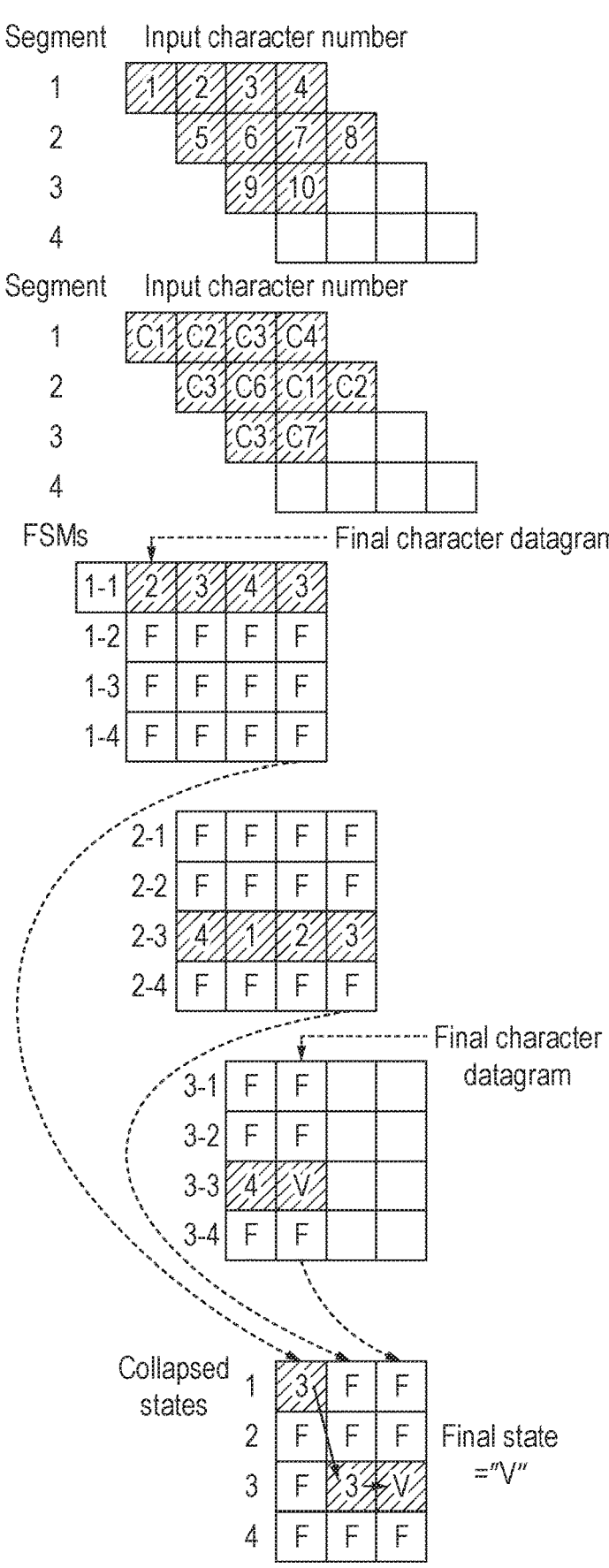
FIG. 7 is a diagram showing a second example processing method in which a data stream illustrated by blocks is processed.

FIG. 7 shows an example processing method in which a data stream illustrated by blocks is processed by four parallel sets of FSMs operating at one quarter the processing rate of the input data stream. In this illustrative example, segmenting is performed every four blocks and the buffers may be filled and refreshed after sixteen blocks. FIG. 4 figure illustrates which blocks are processed by each set of FMSs and the transitions conditions and states based on the example in FIG. 3.

IN this example, a 10-character sequence is processed. The top element of FIG. 7 shows where the characters are loaded into the FSM buffers. Based on the content of the input character sequence the next element in FIG. 7 shows the conditions by which the state machine transitions are triggered by the sequence. The next three elements of FIG. 7 show the states of the multiple FSMs processing the three segments associated with the 10-character sequence. The final element in FIG. 7 shows how the FSM states are "collapsed" into a single matrix that can then be used to calculate the actual state sequence and show whether or not there is a valid path from the known start state (Segment 1 state 1) through to the valid state "V" for the final character.

In this example, data files may not be processed contiguously, as in the previous example. Instead, each subsequent data file is processed separately. In other words, each segment comprises data for one data file, so a new data file initiates a new segment. In some examples, such as this one, the segment containing the start of a new data file may be a first segment processed by the first set of FSMs. In such an example, segmenting may be based on a predetermined data length, except when a new data file is processed.

Accordingly, there may be an inter-packet gap. This may allow FSMs to be cleared down and for a syntax validity decision to be made. As shown in FIG. 7, the 10-character string fills the first and second segments, partially fills the third segment, but does not fill the fourth segment. Accordingly, processing of this data file is only performed by the first to third FSMs, as shown.

The final element in FIG. 7 shows how the final state for each segment is passed to the next segment. At that point, the unknown initial state for the second segment becomes known. Similarly, when the second segment is processed the final state is passed to the next segment (which is processed by the first set of FSMs).

In a specific implementation of the invention a processor has a bus width of 64 bits and thus receives blocks of 8 characters per clock cycle which it processes in a 8×8 parallelogram, i.e. 8 sets of 8 FSMs.

In order to ensure correct mapping each set of FMS must include FSMs having initial states corresponding to each possible state. To avoid redundancy, the number of FSMs in each set may be the same as the number of possible states.

The plurality of identical FSMs processing each data stream, i.e. within a one set of FSMs, may each perform said processing substantially in parallel. The smaller the delay in processing between said plurality of FSMs, the greater the improvement in processing speed.

The processing method described above is particularly advantageous when the input data rate is greater than the processing rate of each individual FSM. In particular, the processing method described above is particularly advantageous when then number of plural sets M multiplied by the processing rate of each FSM is equal to or greater than the input data rate. In other words, the processing rate relative to an individual FSM can be improved upon by a factor M corresponding to the number of sets of FSMs. If each set of FSMs comprises N FSMs (corresponding to the number of possible FSM states), then this factor M improvement can be achieved by using M×N FSMs.

Plural FSMs may be implemented by a single processor with parallel processing capabilities, such as an FPGA or GPU. Alternatively, each FSM may be implemented by a different processor.

For individual FSMs able to process data at a rate of around 1 Gbit/s, 10 sets of plural FSMs would enable a processing rate of around 10 Gbit/s. This may allow a 10 Gigabit Ethernet data stream to be processed by hardware FSMs with an individual serial processing rate of 1 Gbit/s.

As shown in FIG. 1, the flow of data between the input network interface 2 and the output network interface 3 may be restricted so as to only occur in the direction from the input network interface 2 to the output network interface 3. This one way transfer function may be implemented by hardware, such as one way electrical connections between respective components that form the input network interface 2 and the output network interface 3. Such a device is often referred to as a data diode.

It should be understood that the above described examples are for illustrative purposes only and the invention may otherwise be implemented without departing from the spirit or scope of the invention as defined by the appended claims.

The invention claimed is:

1. A method of processing a network data stream to perform a syntax checking process on the network data stream, using a data diode device, comprising:

receiving an input data stream via an input network interface of the data diode device;

one or more processing units of the data diode device;

segmenting the received input data stream into a plurality of data stream segments;

processing the data stream segments using plural sets of plural identical finite state machines configured to verify that the content of the input data stream complies with a predefined syntactic structure, wherein successive data stream segments are processed by different sets of said plural sets and said plural identical finite state machines comprises finite state machines having initial states corresponding to every different possible state;

recording the initial state before processing and a final state after processing, for each state machine;

generating an output based on mapping the final state for a data stream segment to a corresponding initial state for a subsequent data stream segment, for each of the plurality of data stream segments, the output determining whether the content of the input data steam does comply or does not comply with the predefined syntactic structure;

outputting an output data stream based on the generated output via an output network interface of the data diode device;

wherein a direction of data transfer across the data diode device is restricted to only occur from the input network interface to the output network interface.

2. The method of claim 1, wherein the segmenting is based on a predetermined data length.

3. The method of claim 1, wherein the data stream comprises data files and each data stream segment comprises data for only one data file.

4. The method of claim 1, wherein the plurality of identical finite state machines processing each data stream each perform said processing in parallel.

5. The method of claim 1, wherein the input data rate is greater than the processing rate of each finite state machine.

6. The method of claim 5, wherein the number of plural sets multiplied by the processing rate of each finite state machine is equal to or greater than the input data rate.

7. The method of claim 5, wherein the input data rate is at least 10 Gbit/s.

8. The method of claim 1, wherein the network data stream is a 10 Gigabit Ethernet data stream.

9. The method of claim 1, wherein, if the input data stream comprises data that does not comply with the predefined syntactic structure, said data is modified before being output.

10. The method of claim 9, wherein the modification comprises wrapping said data.

11. The method of claim 1, wherein the finite state machines comprise one or more counters, wherein said output is also based on combining counter values for the data stream segment and subsequent data stream segment.

12. A data diode device for processing a network data stream, comprising:

input network interface configured to receive an input data stream;

one or more processing units configured to:

segment the received input data stream into a plurality of data stream segments;

process the data stream segments using plural sets of plural identical finite state machines configured to verify that the content of the input data stream complies with a predefined syntactic structure, wherein successive data stream segments are processed by different sets of said plural sets and said plural identical finite state machines comprises finite state machines having starting states corresponding to every different possible state;

record the initial state before processing and a final state after processing, for each state machine;

generate an output based on mapping the final state for a data stream segment to a corresponding initial state for a subsequent data stream segment, for each of the plurality of data stream segments, the output determining whether the content of the input data steam does comply or does not comply with the predefined syntactic structure; and an output network interface configured to output an output data stream based on the generated output;

wherein a direction of data transfer across the data diode device is restricted to only occur from the input network interface to the output network interface;

wherein the direction of data transfer across the device is restricted to only occur from the input network interface to the output network interface.

13. The data diode device of claim 12, wherein, if the input data stream comprises data that does not comply with the predefined syntactic structure, said data is modified by the one or more processing units before being output.

14. The data diode device of claim 13, wherein the modification comprises wrapping said data.

* * * * *